BLOCKING OSCILLATOR HAVING A CONTROLLED RISE TIME

Filed June 21, 1960 2 Sheets-Sheet 1

INVENTOR.
EINAR NAESS
BY
S. J. Rotondi, A. J. Dupont, F. E. McGee and J. P. Vandenburg Nov. 12, 1963 E. NAESS 3,110,871

BLOCKING OSCILLATOR HAVING A CONTROLLED RISE TIME

Filed June 21, 1960 2 Sheets-Sheet 2

INVENTOR.
EINAR NAESS
BY
S.J. Rotondi, A.J. Dupont, F.E. McGee
and J.P. Vandenburg United States Patent Office 3,110,871 Patented Nov. 12, 1963

3,110,871
BLOCKING OSCILLATOR HAVING A CONTROLLED RISE TIME

Einar Naess, Washington, D.C., assignor to the United States of America as represented by the Secretary of the Army Filed June 21, 1960, Ser. No. 37,809
3 Claims. (Cl. 331—148)
(Granted under Title 35, U.S. Code (1952), sec. 266)

Figure 1:
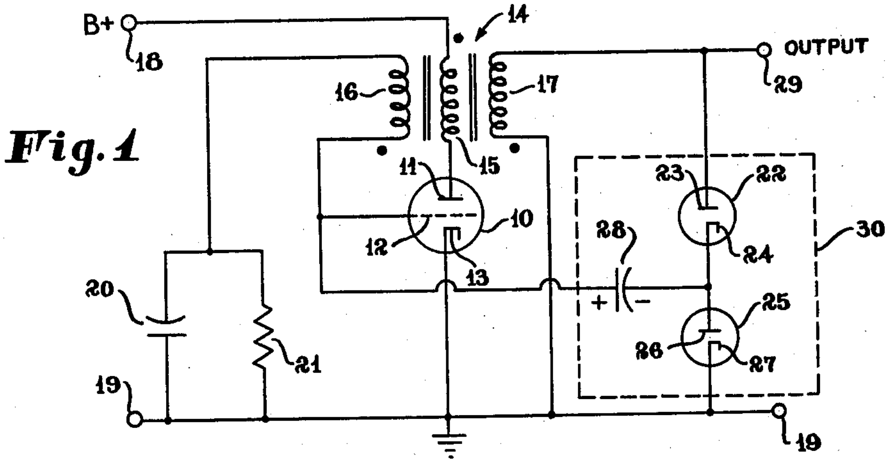

The invention described herein may be manufactured and used by or for the Government for governmental purposes without the payment to me of any royalty thereon.

This invention relates to blocking oscillator circuits and more particularly to a novel control circuit for controlling the rise time of a blocking oscillator output signal without causing any undesired changes in the decay time of the output signal.

A blocking oscillator may be employed in several applications which require that the decay time of the output pulses be held fixed independently of any selected rise time.

For example, one such application involves a blocking oscillator modulating a magnetron. In an arrangement of this kind, the blocking oscillator controls the generation of substantially rectangular pulses of R.-F. energy by furnishing the plate voltage necessary to energize the magnetron. In order to insure optimum functioning of the magnetron, the rates of rise of the blocking oscillator output pulses must differ widely from the rates of decay thereof; otherwise, misfiring or even sparking of the magnetron may ocur, as will be explained in more detail below.

Since blocking oscillators find general utility as pulse generating circuits, many other applications will be apparent in which this type of waveform control is desired.

In conventional blocking oscillators, the rates of rise and decay of each output pulse, determined primarily by the leakage inductance of the coupling transformer, are substantially identical. Such blocking oscillators produce a symmetrical output pulse and provide no control over pulse rise time for given circuit parameters.

In the past, suitable modulating voltage was obtained from blocking oscillators by applying an additional load, either resistive or capacitive, across their output terminals. An acceptable rate of rise of the modulating pulses was provided, but the inclusion of the additional load simultaneously decreased the rate of decay of these pulses. The latter change detracts from optimum performance of the magnetron by reducing the sharpness of termination of its R.-F. pulses.

An object of the present invention is to furnish an improved blocking oscillator circuit in which control of the output rise time is independent of the decay time.

Another object of this invention is to improve the performance of a blocking oscillator used as a modulator for a magnetron.

A further object of this invention is to provide a blocking oscillator control circuit which varies the rate of rise of the oscillator output but has no effect upon its rate of decay.

A typical embodiment of the blocking oscillator circuit in accordance with the instant invention comprises an electronic amplifying device, a transformer coupling the output of the amplifier to its input control grid, and a resistor-condenser network in the control grid circuit for cutting off the amplifying device after grid current is drawn. In addition, a control circuit including a capacitor and two diode switching devices is connected in series between the control grid and the output circuit of the amplifier. This control circuit responds to the voltages existing at both the control grid and the oscillator output terminal to connect a capacitive load between the amplifier's control grid and the cathode during the rise period of these voltages. Subsequently, the control circuit responds to disconnect the capacitive load and to discharge the capacitor during the remaining portions of the oscillator's cycle of operation.

The specific nature of the invention, together with other objects, aspects, uses and advantages, will be apparent from the following description and from the accompanying drawing, in which:

FIG. 1 is a schematic diagram of a blocking oscillator in accordance with the invention.

Figure 2A:
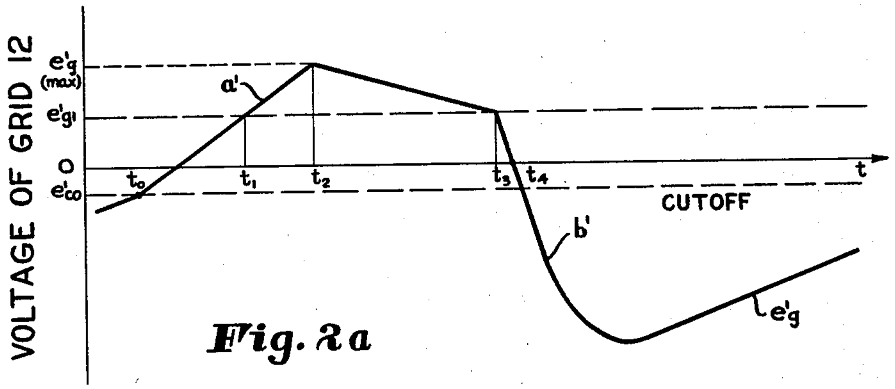
Figure 2B:
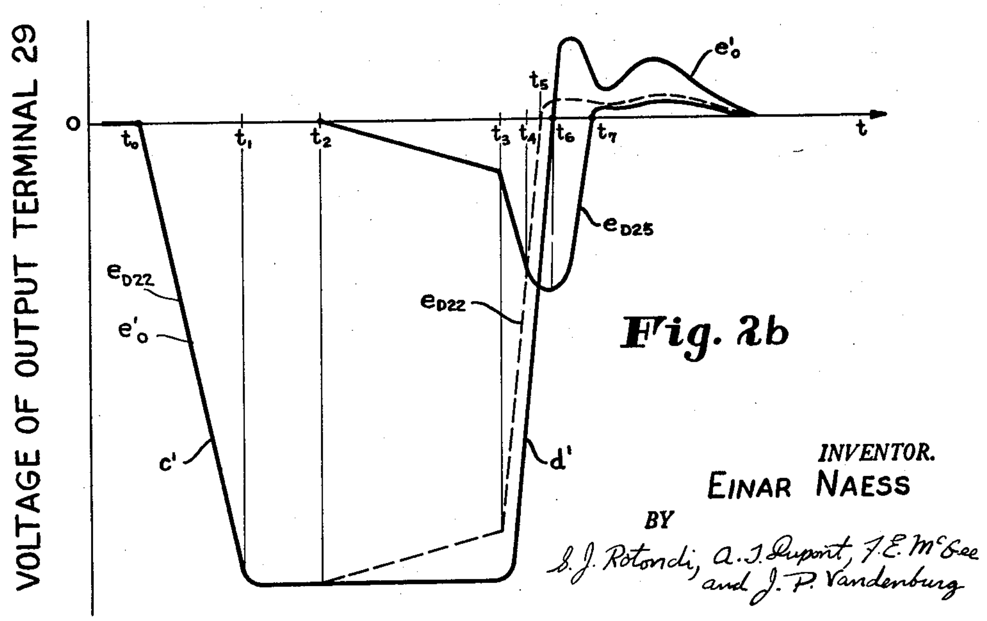

FIGS. 2*a* and 2*b* are graphs displaying the voltage waveforms present during operation of the network of FIG. 1 with the control circuit incorporated therein in accordance with the present invention.

Figure 3A:
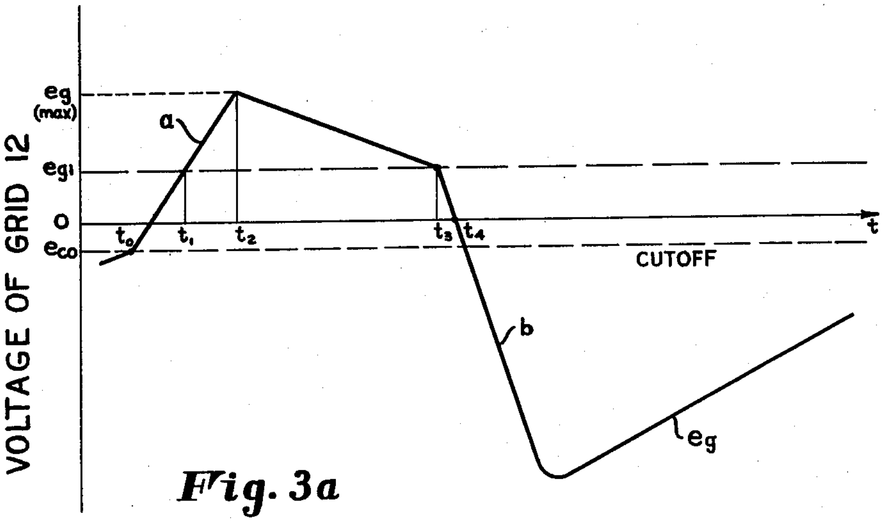
Figure 3B:
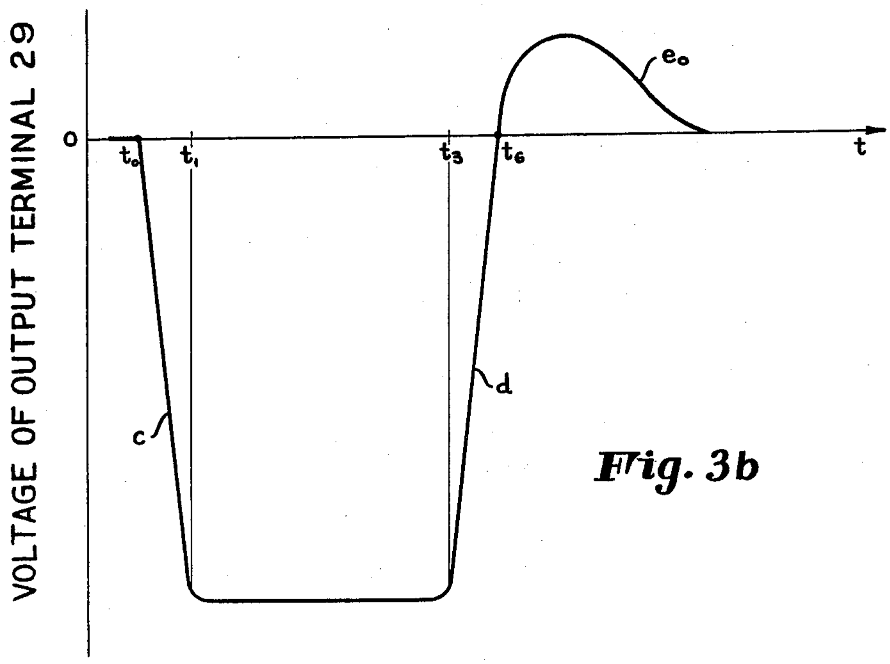

FIGS. 3*a* and 3*b* are graphs showing voltage waveforms for the network of FIG. 1 with the control circuit removed.

In FIG. 1 of the drawing, a triode 10, including a plate 11, a control grid 12 and a cathode 13, has its plate 11 coupled to a B+ voltage source 18 through a first winding 15 of a transformer 14. The cathode 13 is directly connected to circuit ground 19. The control grid 12 is attached to one end of a second winding 16 of transformer 14. The parallel combination of a capacitor 20 and a grid-leak resistor 21 is connected between the opposite end of winding 16 and ground 19. The transformer 14 also contains a third winding 17, one end of which is grounded while its other end forms an output terminal 29. The conventional dot notation is used in FIG. 1 to indicate relative voltage polarities.

The rise time control circuit of the invention, indicated generally at 30 in FIG. 1, is connected between the oscillator output and the control grid 12. A pair of fast switching diodes 22 and 25, having anodes 23, 26 and cathodes 24, 27, are connected in series across the terminals of winding 17. Both diodes are poled in the same direction. Anode 23 is connected to terminal 29, cathode 24 is joined to anode 26 and cathode 27 is grounded. A capacitor 28 has one plate connected directly to control grid 12 of tube 10 and its other plate attached to the junction between cathode 24 and anode 26 of the diodes.

The operation of the FIG. 1 embodiment may be explained with reference to the waveforms shown in FIGS. 2*a*, 2*b*, 3*a* and 3*b*.

Conventional blocking oscillator operation is illustrated by the waveforms of FIGS. 3*a* and 3*b*. This corresponds to the omission of the control circuit in the circuit of FIG. 1, cathode 24 being connected to ground 19. The voltage of control grid 12 is shown at A and the output voltage of terminal 29 appears in FIG. 3*b*. The operation of such an oscillator is well known; see, for example, the explanation in Active Networks by Rideout, Prentice Hall, New York, 1954, at pages 421 to 423. It is to be especially noted that with the conventional blocking oscillator the slopes of segments *a*, *b*, *c* and *d* of the response curves of FIGS. 3*a* and 3*b* are substantially the same. Thus the rate of rise of the output voltage is the same as its rate of decay, because each is determined by the winding resistances and the leakage inductance of transformer 14.

The uniform rates of pulse rise and decay noted above render a conventional blocking oscillator unsuitable as a magnetron modulator in arrangements wherein sharply defined or nearly rectangular pulses of R.-F. energy are desired. This is true because of the limitation on the rise time of the blocking oscillator output imposed by considerations for the prevention of magnetron misfiring or sparking. It has been found that if the rate of rise of plate voltage applied to a magnetron exceeds a certain limit, the magnetron will often operate as a diode and consequently will not produce any R.-F. output. This is termed "misfiring." Further, under such conditions large particles may become dislodged from the cathode because of a heavy current drain causing serious damage to or failure of the magnetron. The latter result is called "sparking," since occasionally an arc is drawn between anode and cathode as a result of this action.

With a modulating voltage which exceeds the rise time limit, there is insufficient time for the formation of R.-F. oscillations in the anode cavities of the magnetron. There is no time for the build-up of a rotating R.-F. field or for velocity modulation of electrons in the interaction space between the anode and cathode of the magnetron. With the large voltage applied immedaitely, electrons are accelerated in a substantially direct path to the anode, resulting in the undesired diode type of operation pointed out above.

The above-mentioned rise time requirement cannot be met successfully by merely increasing the rise time to an acceptable level through selection of transformer parameters or additional loading of the output in a conventional blocking oscillator. These measures increase equally the decay time of the output pulses. Such reductions of the rate of decay of the blocking oscillator pulses will adversely affect the sharpness of cutoff of the R.-F. oscillations at the end of a magnetron pulse. With a sufficiently short decay time of the magnetron's plate voltage, as determined by the blocking oscillator response, the R.-F. output pulses are terminated as sharply as possible for a given magnetron tube. The limiting factor under such conditions is the Q of the anode cavity in the magnetron employed. However, it has been found that if the blocking oscillator output has a longer decay time, corresponding to the lower rate of rise necessary to avoid misfiring, etc., the magnetron output will follow the slow decay of the blocking oscillator signal. The result is a poorly defined trailing edge of the R.-F. pulse.

The blocking oscillator circuit of the instant invention fulfills the conflicting waveform requirements established by the magnetron's characteristics. A comparison of segments $c'$ and $d'$ in FIG. 2$b$ with the corresponding sections $c$ and $d$ of the conventional signal of FIG. 3$b$ shows that the desired rate of decay is retained. It should be further observed that the rate of rise can be adjusted to a value at which sparking or misfiring is prevented.

In the embodiment of FIG. 1, it is assumed that the grid circuit capacitor 20 has been negatively charged and the control circuit capacitor 28 has been discharged during the preceding cycle. The variation of control grid voltage during a typical cycle of oscillation is shown by curve $e_g'$ in FIG. 2$a$. Prior to time $t_0$ in FIGS. 2$a$ and 2$b$, triode 10 is biased below cutoff by the voltage across capacitor 20. At time $t_0$, capacitor 20 has discharged to a sufficient extent across grid-leak resistor 21 for the bias voltage at control grid 12 to rise above cutoff. During the time interval from $t_0$ to $t_1$, the plate current commences to flow and continuously increases. A feedback voltage is thereby induced in winding 16 of transformer 14 which is positive at the dot end connected to control grid 12. Since the induced voltage has the proper polarity to cause diode 25 to conduct, capacitor 28 is charged by the voltage appearing across winding 16 at this time, with the polarity shown in FIG. 1. Therefore, the potential of control grid 12 increases at a reduced rate with a time constant depending upon the capacitance of element 28. The reduced rate, compared to normal blocking oscillator operation, is shown by segment $a'$ of the waveform in FIG. 2$a$.

Of course, the output pulse induced in winding 17, being controlled by the signal at grid 12, has a corresponding rate of rise illustrated by segment $c'$ in FIG. 2$b$. It should be apparent that any desired rise time for the output pulse may be obtained by the selection of the proper capacitance for element 28 in the circuit of the present invention.

When the control grid 12 is driven positive, grid current is drawn in triode 10 and capacitor 20 is charged negatively while the effective grid resistance of the triode is low.

At time $t_1$, the plate current reaches saturation, but due to the leakage inductance of transformer 14, the voltage impressed upon control grid 12 continues to rise between times $t_1$ and $t_2$. The positive grid voltage at which plate current saturation in triode 10 occurs is labeled $e_g{'}_1$ in FIG. 2$a$. The voltage $e_g'$ of control grid 12 equals $e_g{'}_1$ at time $t_1$, causing plate current saturation. The potential at control grid 12 reaches its maximum value at time $t_2$ when there is no longer an induced voltage across winding 16. The capacitor 28 is now fully charged to the voltage $e_g'$ (max.) and would tend to discharge, but since diode 25 cannot conduct in the direction of such discharge, capacitor 28 remains charged to the peak grid voltage. At time $t_2$ a reverse voltage equal to the output voltage is impressed across diode 22.

During the balance of the pulse width period of the output pulse, between times $t_2$ and $t_3$ in FIGS. 2$a$ and 2$b$, the voltage of control grid 12 decreases slowly as shown therein. Also, in this interval, the voltage across diode 25 becomes increasingly negative with respect to ground and the reverse voltage across diode 22 is reduced somewhat. These voltages are illustrated in FIG. 2$b$ by the curves labeled respectively $^eD25$ and $^eD22$. The output pulse $e_0'$ is flat, however, since during the pulse width period $^eD22 + {^eD25} = e_0'$. Also, $^eD25 = e_g' - e_g'$ (max.), and therefore $^eD22 = e_0' - [e_g' - e_g'$ (max.)].

At time $t_3$, the voltage at grid 12 regains control over the plate current causing the latter to drop below its saturation level. A negative induced voltage in winding 16 proportional to the rate of change of plate current drives the grid voltage toward cutoff. This regenerative action typical of a blocking oscillator rapidly cuts off conduction in tube 10. The corresponding voltage induced in winding 17 is shown by segment $d'$ in FIG. 2$b$. The rate of decay of output pulse $e_0'$, from times $t_3$ to $t_6$, is the same as that produced by a conventional blocking oscillator, for any given tube 10 and transformer 14. Further, the rate of decay is independent of the rate of rise at $c'$. This desired result is obtained by virtue of the switching action of diodes 22 and 25 in response to the voltages applied to them in the circuit of FIG. 1. During the interval between times $t_2$ and $t_4$, since the voltage of grid 12 is driven negatively, the potential of anode 26 of diode 25 is negative with respect to its cathode 27. Further, in this interval the potential of anode 23 of diode 22 is negative with respect to its cathode 24 because, until time $t_4$, $^eD22$ is more negative than $^eD25$ as seen in FIG. 2$b$. Therefore, both diodes 22 and 25 present their large reverse impedances to the grid signal. Both diodes act as open switches in the afore-mentioned interval effectively to disconnect capacitor 28 from the grid circuit of triode 10 and to maintain the charge on capacitor 28. As a result, control circuit 30 has no effect upon the rate of decay of the output pulse $e_0'$.

At the time $t_4$ the voltage across diode 22 is reversed and it can conduct, since although anode 23 has a negative potential between $t_4$ and $t_5$, its cathode has a larger negative potential as illustrated by curves $^eD22$ and $^eD25$. Since diode 22 is thus biased in its forward direction at time $t_4$, capacitor 28 is charged in the reverse direction with energy taken from the signal in winding 17. Capacitor 20 is also charged to some extent oppositely from the charge it received between times $t_1$ and $t_2$. The current path extends from terminal 29 through diode 22, capacitor 28, winding 16 and capacitor 20 to the opposite end of winding 17. The positive oscillation of the output voltage $e_0'$ which occurs after time $t_6$ is attenuated more rapidly than the output $e_0$ of the conventional blocking oscillator. The charging current also prevents grid voltage $e_g'$ from going as far negative as it would have without rise time control. The voltage across capacitor 20 at time $t_4$ together with the resistance of 21 and the capacitance of 20 determines the repetition rate of the output pulses. In order to maintain a given repetition rate when the rise time control of this invention is employed, the resistance of resistor 21 may be increased.

By time $t_7$ the capacitor 28 has been recharged oppositely from the polarity shown in FIG. 1, to a sufficient extent so that the voltage across diode 25 is zero. Both diodes 22 and 25 conduct between terminal 29 and ground, operating as conventional damper diodes and also removing the remaining charge on capacitor 28. At the beginning of the following pulse period, capacitor 28 will be completely discharged to a negative voltage equal $e'_{co}$, the cutoff voltage for triode 10. The above sequence of events is repeated for subsequent output pulses.

The switching times of diodes 22 and 25 must be much less than the rise time or decay time of the output pulses. The same requirement is encountered for conventional damper diodes connected across the output of a blocking oscillator however, and the same type of diode should be employed in the present invention.

It should be apparent that the pulse repetition rate may be varied as desired by varying the resistance of resistor 21. The shape and width of the output pulse may be controlled by selection of proper transformer design and the capacitance of capacitor 20, in accordance with standard blocking oscillator practice.

It should be realized that the principle of the instant invention may be applied equally well to transformer-coupled amplifiers in general wherein rise time control is desired. The control signal source applied to the amplifier input is not necessarily limited to a feedback connection from the output circuit in the manner shown in the specific embodiment of FIG. 1.

It will be apparent that the embodiment shown is only exemplary and various modifications can be made in construction and arrangement within the scope of the invention as defined in the appended claims.

I claim as my invention:

1. In a blocking oscillator, control means having an input and an output, means for coupling said output to said input, and means connected to said input for controlling the rate of rise of the output, said last-mentioned means including a capacitor, two diodes connected in series across said output, and means connecting said capacitor to the junction point of said diodes.

2. An improved blocking oscillator for producing an output voltage for modulating a magnetron comprising in combination:

vacuum tube amplifying means having an input circuit including a control grid and an output circuit; positive feedback means coupling said output circuit to said input circuit and comprising a first portion conductively coupled to said output circuit and a second portion conductively coupled to said input circuit; condenser means connected to said second portion of said feedback means so that said condenser means, said second portion and said control grid form a series circuit, whereby said condenser means provides relaxation oscillation of said amplifying means; and means for selecting the rise time of said output voltage while maintaining a constant decay time thereof, said last mentioned means including a capacitor having one end connected to said control grid and a pair of diodes connected in series across said output circuit and means connecting the other end of said capacitor to the junction point of said diodes.

3. An improved blocking oscillator having a controllable output pulse rise time comprising in combination: a vacuum tube having an anode, a cathode and a control grid, means connecting said cathode to a point of reference potential; a transformer including first, second and third windings; a supply voltage source connected to one end of said first winding, the other end of said first winding being connected to said anode, a first capacitor connected between said cathode and one end of said second winding, the other end of said second winding being connected to said control grid, a grid-leak resistor connected in parallel with said first condenser, an output terminal connected to one end of said third winding, the other end of said third winding being connected to the point of reference potential; a pair of unidirectional conducting devices connected in series across said third winding and both poled in the same predetermined direction, so that negative pulses are induced in the third winding, and a second capacitor connected between said control grid and the common junction between said unidirectional conducting devices so that the rate of rise of said negative pulses is controlled independently of the rate of decay thereof.

References Cited in the file of this patent

FOREIGN PATENTS 146,322 Australia ---------------- May 5, 1952

OTHER REFERENCES

Millman et al.: Pulse and Digital Circuits, © 1956, pages 272–275.